United States Patent [19]

Chen et al.

[11] Patent Number: 5,722,689
[45] Date of Patent: Mar. 3, 1998

[54] CUSHIONING DEVICE FOR SAFETY BELT OF VEHICLE

[76] Inventors: Fou Min Chen; Chin Chen Chen, both of No. 68, Yumin Street, Changhua City, Taiwan

[21] Appl. No.: 751,990

[22] Filed: Nov. 19, 1996

[51] Int. Cl.[6] ............................................. B60R 22/28
[52] U.S. Cl. ................................... 280/805; 297/471
[58] Field of Search ............................. 280/805, 808; 297/470, 471, 472

[56] References Cited

U.S. PATENT DOCUMENTS

| | | | |
|---|---|---|---|
| 3,744,814 | 7/1973 | Sturman | 297/471 |
| 3,938,627 | 2/1976 | Nagazumi | 297/472 |
| 5,054,815 | 10/1991 | Gavagan | 280/808 |
| 5,139,282 | 8/1992 | Mein | 280/808 |
| 5,468,045 | 11/1995 | Weber | 297/471 |

FOREIGN PATENT DOCUMENTS 2802341 7/1979 Germany ............... 280/805

*Primary Examiner*—Paul N. Dickson
*Attorney, Agent, or Firm*—Charles E. Baxley, Esq.

[57] ABSTRACT

A device for cushioning a safety belt of a vehicle includes a resilient member having one end secured to the vehicle and having a clamping device secured to the other end. The resilient member includes two or more plates having a middle portion secured together for increasing the resilience of the resilient member. A bracket is secured to the other end of the resilient member and a flap is pivotally coupled to the bracket for engaging with and for securing the safety belt and for allowing the safety belt to be resiliently moved for a distance.

5 Claims, 5 Drawing Sheets

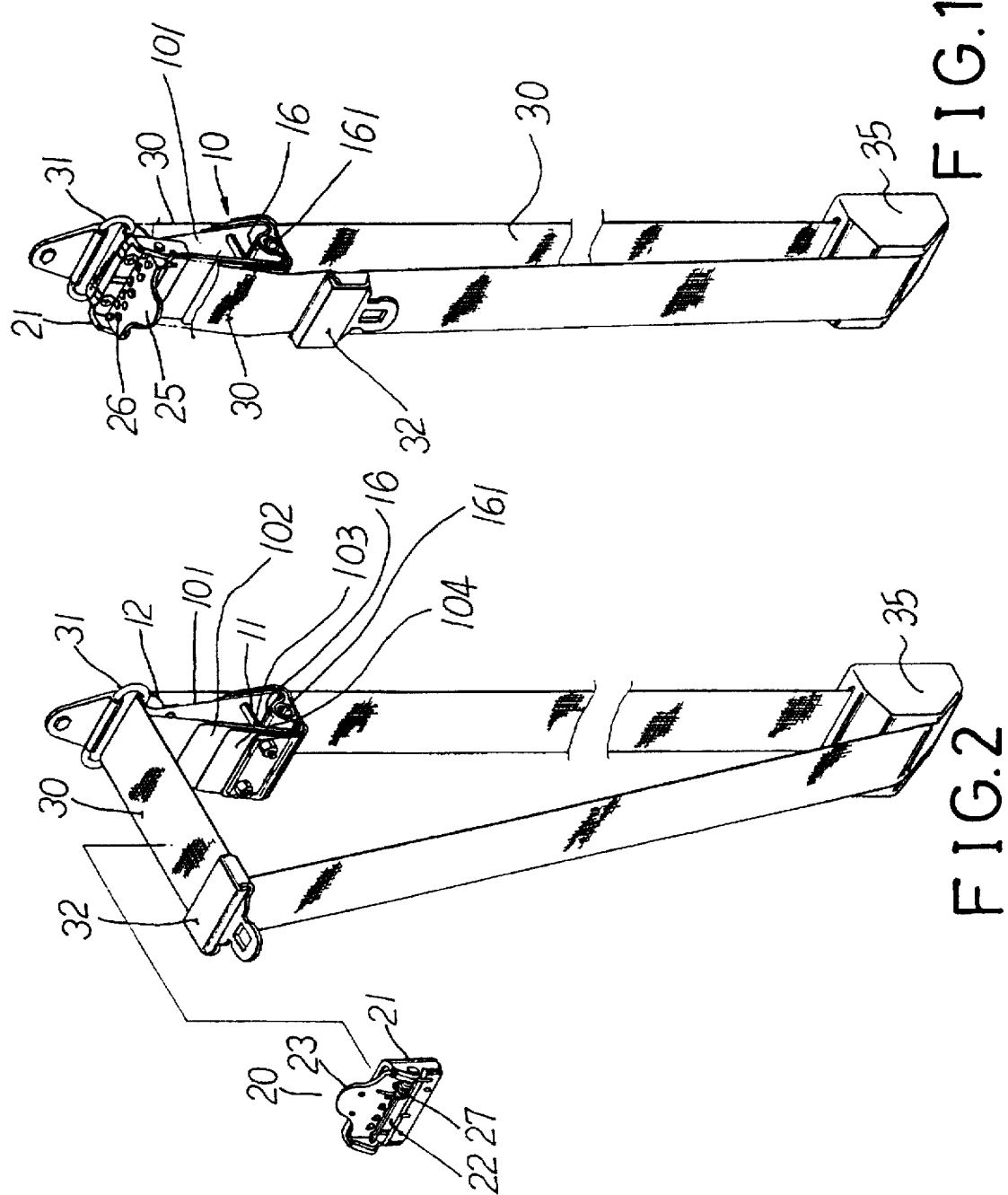

5,722,689

CUSHIONING DEVICE FOR SAFETY BELT OF VEHICLE

BACKGROUND OF THE INVENTION

1. Field of the invention

The present invention relates to a safety belt of a vehicle, and more particularly to a safety belt having a cushioning device.

2. Description of the Prior Art

Typical safety belts comprise a roll for rotatably receiving a belt and a resilient member is applied to the belt for allowing the safety belt to be pulled out resiliently and for retracting the safety belt backward into a receiving box. When the safety belt is pulled outward suddenly or when the vehicle strike onto an object, a lock device may solidly lock the safety belt in place such that the safety belt may not be moved at this moment. However, the passenger may move forward suddenly and may be hurt by the safety belt when the safety belt is solidly locked in place.

The present invention has arisen to mitigate and/or obviate the afore-described disadvantages of the conventional safety belts.

SUMMARY OF THE INVENTION

The primary objective of the present invention is to provide a cushioning device engaged onto the safety belt for resiliently pulling the safety belt and for allowing the safety belt to move a small distance so as to prevent the passenger from being hurt by the safety belt.

In accordance with one aspect of the invention, there is provided a cushioning device for engaging with a safety belt of a vehicle and for cushioning the safety belt, the cushioning device comprises a resilient member including a first end for securing to the vehicle and including a second end, and means for securing the second end of the resilient member to the safety belt and for allowing the safety belt to be resiliently moved for a distance.

The resilient member includes a first plate having a middle portion, and includes at least one second plate secured to the middle portion of the resilient member for increasing a resilience of the resilient member.

The first plate and the second plate are U-shaped having a lower portion secured together.

The first plate includes a bulge formed thereon opposite to the second plate.

The resilient member includes a tubular member engaged in the bulge for increasing the resilience of the resilient member.

The securing means includes a bracket secured to the second end of the resilient member and having a chamber for receiving the safety belt, a flap pivotally coupled to the bracket and having a plurality of projections for engaging with the safety belt, and means for biasing the projections of the flap to engage with the safety belt.

The securing means includes a retainer secured to the second end of the resilient member, the retainer includes two openings formed therein for engaging with the safety belt and for defining a beam therebetween, the retainer allows the second end of the resilient member to be bent and moved toward the first end of the resilient member when the safety belt is moved by a passenger.

Further objectives and advantages of the present invention will become apparent from a careful reading of a detailed description provided hereinbelow, with appropriate reference to accompanying drawings.

BRIEF DESCRIPTION OF THE DRAWINGS

FIGS. 1 and 2 are perspective views of a cushioning device for a safety belt in accordance with the present invention;

DETAILED DESCRIPTION OF THE PREFERRED EMBODIMENT

Figure 3:
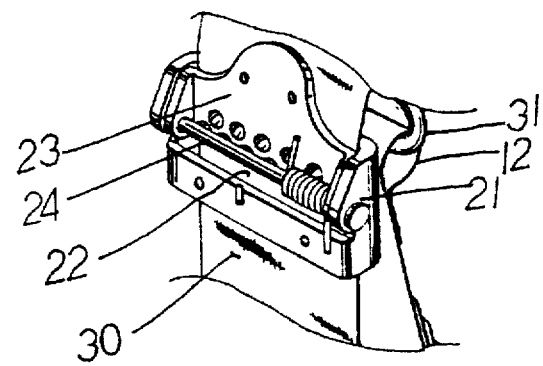
FIG. 3 is a partial perspective views of the cushioning device.
Figure 5:
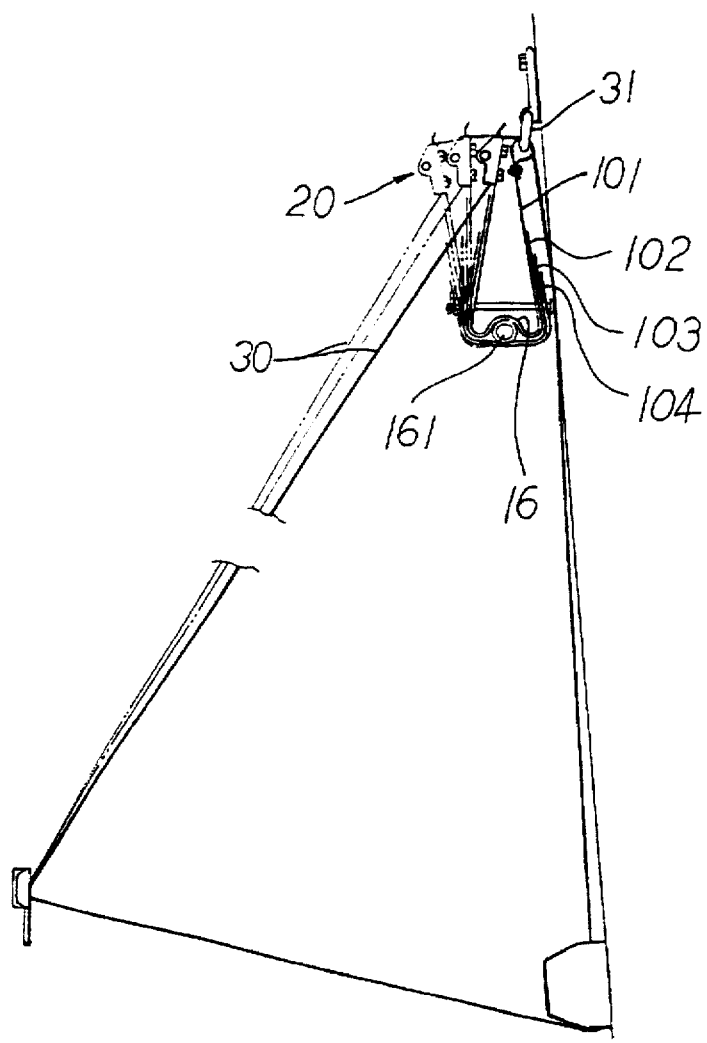
FIG. 5 is a side view illustrating the operation of the cushioning device.

Referring to the drawings, and initially to FIGS. 1 to 5, a cushioning device for a safety belt of a vehicle in accordance with the present invention comprises a resilient member 10 including four resilient plates 101, 102, 103, 104 secured together in the middle portion. The plates 101–104 are U-shaped having the lower portion secured together by such as bolts and nuts 11. The plate 102 is longer than the plate 103 which is longer than the plate 104 such that the resilient member 10 includes a stronger lower portion and includes a resilient upper portion. The resilient member 40 includes a bulge 16 formed in the bottom portion and a resilient tubular member 161 of rubber material is engaged in the bulge 16 for increasing the resilience of the resilient member 10. The vehicle normally includes a box 35 provided in the lower portion for resiliently receiving the safety belt 30. The box 35 includes a lock device for locking the safety belt 30 in place when the safety belt is pulled outward suddenly or when the vehicle strike onto an object.

The resilient member 10 includes a cylindrical member 12 formed in one end for engaging with a loop 31 which is typically provided in the vehicle, and secured to the loop 31 by bolts and nuts 13. The safety belt 30 also includes one end secured to the loop 31. A clamping device 20 is secured to the other end of the resilient member 10 and includes a bracket 21 secured to the member 10 by screws 13 and includes a chamber 22 and a gap 25 for engaging with the safety belt 30. A flap 23 is pivotally coupled to the bracket 21 by a pin 24 and includes a number of projections 26 for engaging with and for clamping the safety belt 30 in place. A spring 27 is engaged on the pin 24 for biasing the projection 26 of the flap 23 to engage with the safety belt 30. The safety belt 30 is typically provided with a coupler 32 for securing to a retainer provided in the middle and lower portion of the cabinet.

In operation, the safety belt 30 may be engaged into the chamber 22 via the gap 25 and the bracket 21 may be secured to the safety belt 30 by the projection 26 of the flap 23, such that the cylindrical member 12 of one end of the resilient member 10 is secured to the safety belt 30 relatively and such that the other end (together with the clamping device 20) of the resilient member 10 is secured to the middle portion of the safety belt 30. When the safety belt is locked in place and when the passenger moves forward suddenly, the clamping device 20 and the other end of the resilient member 10 may be moved away from the cylindrical member 12 of the resilient member 10 so as to cushion the shocks transmitted to the safety belt 30 and so as to prevent the passenger from being hurt.

Figure 4:
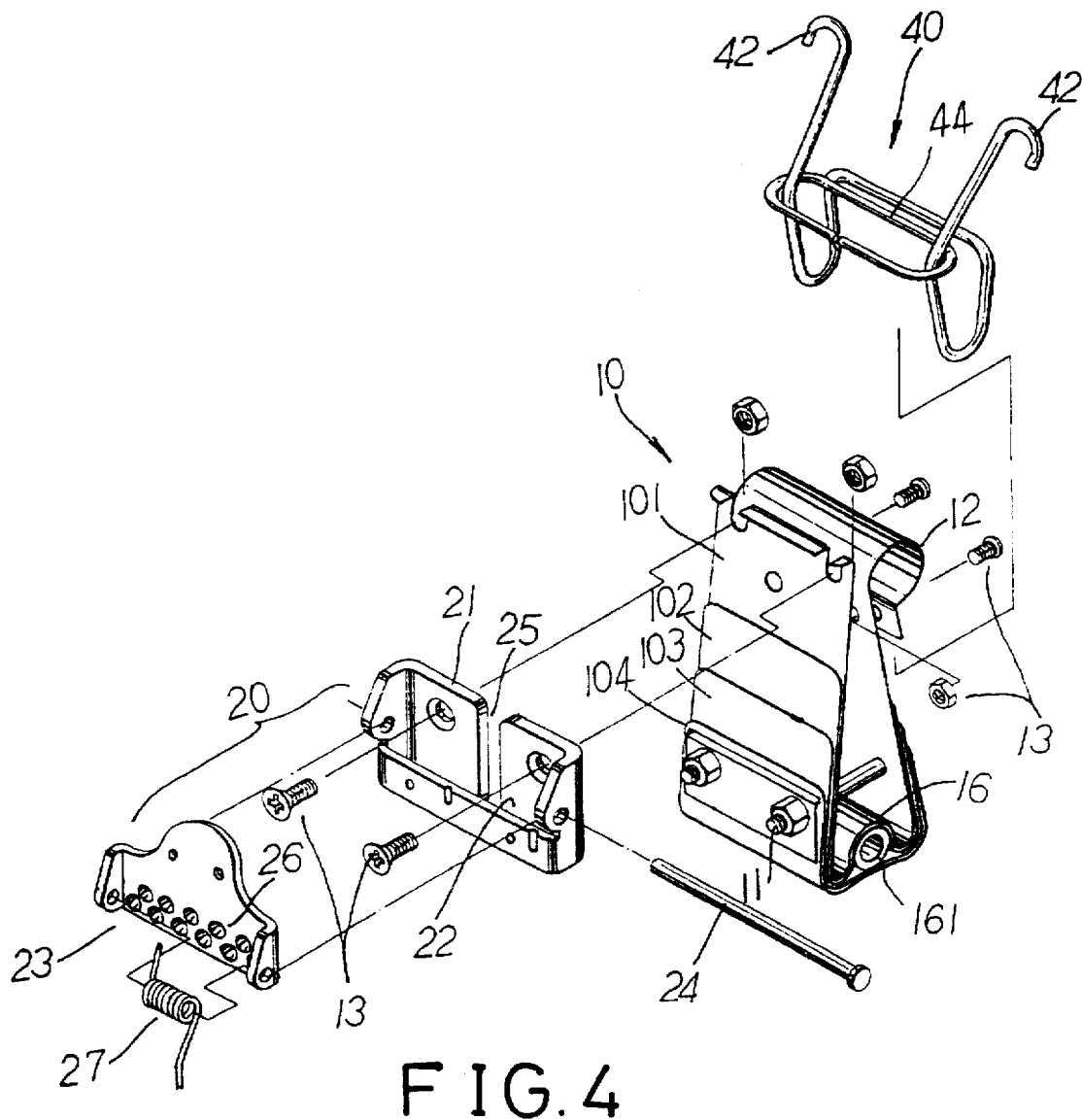
FIG. 4 is an exploded view of the cushioning device.
Figure 6:
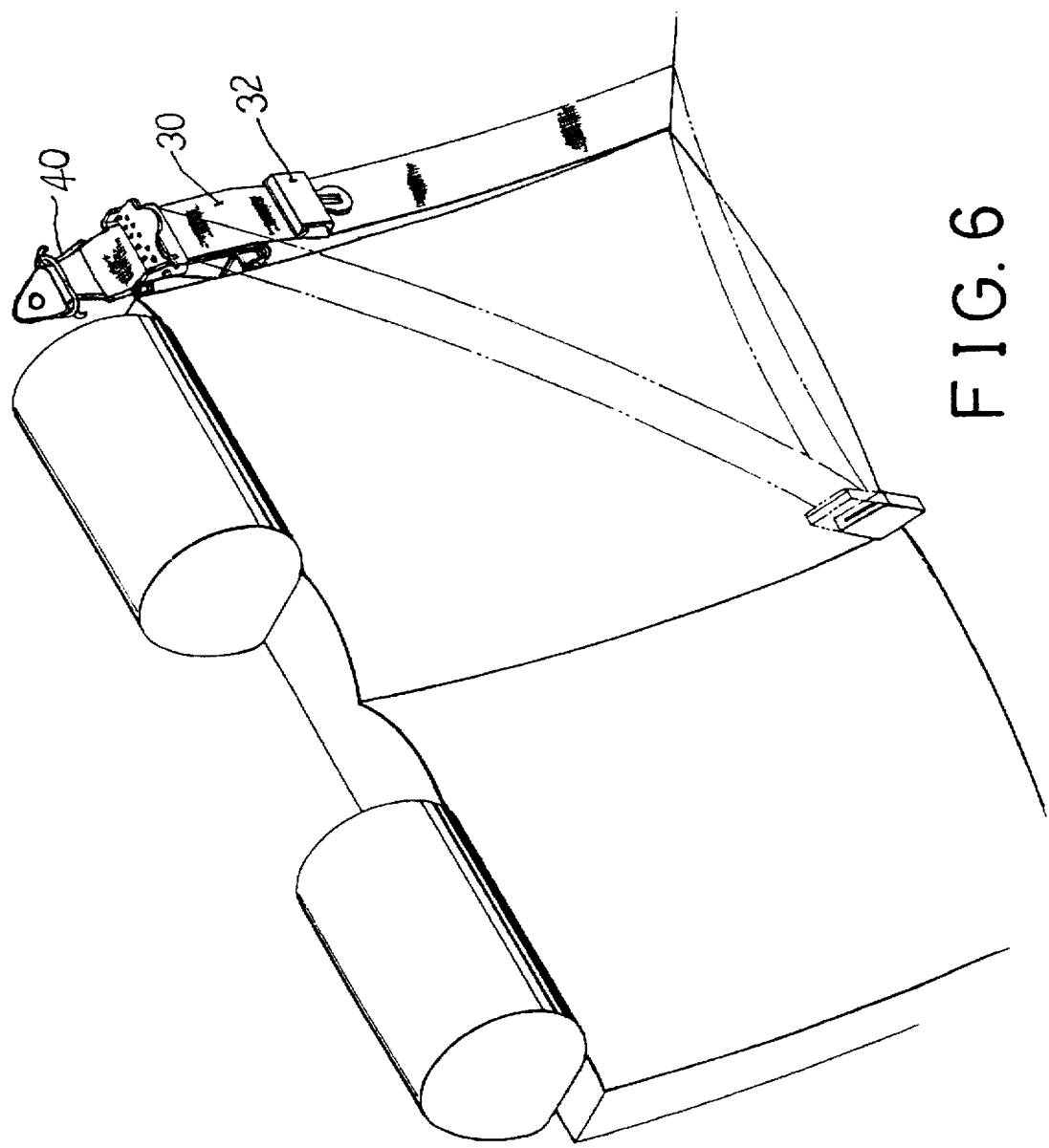
FIG. 6 is a perspective view illustrating the operation of the cushioning device.
Figure 7:
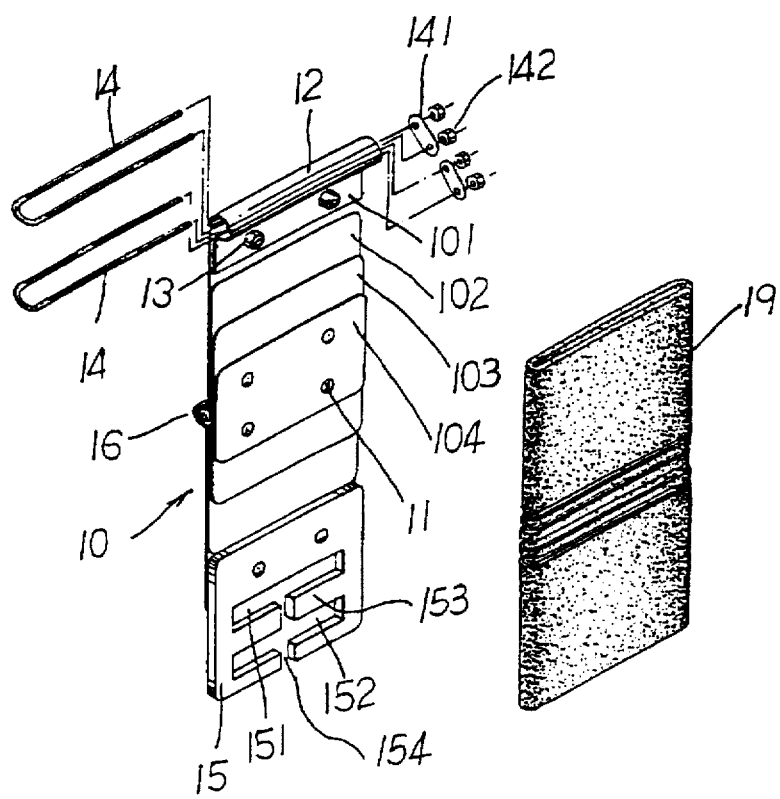
FIG. 7 is an exploded view illustrating another application of the cushioning device.
Figure 8:
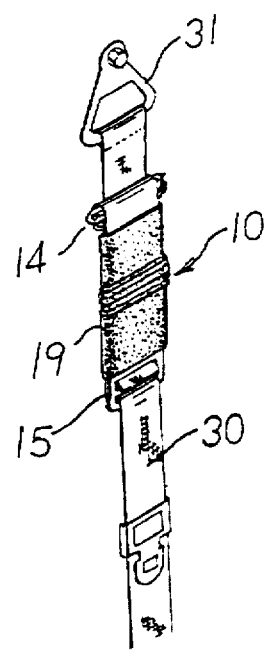
FIG. 8 is a perspective view of the cushioning device as shown in FIG. 7.
Figure 9:
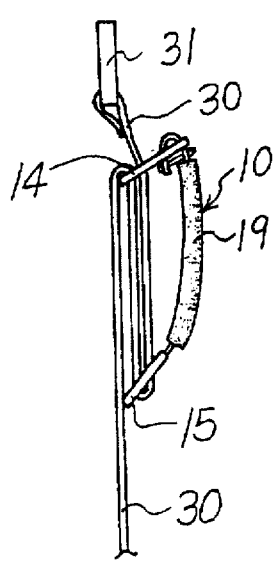
FIG. 9 is a side view of the cushioning device as shown in FIG. 8.

Referring next to FIG. 6 and again to FIG. 4, when the rear seat of the vehicle has no loop 31 (FIGS. 1, 2) provided therein or when the safety belt of the rear seat has not being hung up, a support 40 is provided for support the resilient member 10 on the upper portion of the vehicle. The support 40 includes two hooks 42 for engaging to the suitable place of the vehicle and includes a pair of bars 44 for engaging with the cylindrical member 12 and for allowing the resilient member 10 to be hung up to the upper portion of the vehicle.

Referring next to FIGS. 7-10, instead of U-shape as shown in FIGS. 1-6, the plates 101-104 of the resilient member 10 include a straight structure having one end secured to the safety belt 30 by screws 13 and having a cylindrical member 12 provided therein for engaging with one or more loops 14 which are secured in place by strips 141 and nuts 142. A retainer 15 is secured to the lower end of the resilient member 10 and includes two openings 151 and a gap 154 for allowing the safety belt 30 to be engaged into the openings 151. A beam 153 is relative formed between the openings 151. It is preferable that a protective sleeve 19 is engaged on the plates 101-104 for protecting the plates and for preventing the plates 101-104 from hurting the passengers. The safety belt 30 has an upper end secured to the loop 31 and is engaged through the loop or loops 14 and is then engaged over the beam 153. The safety belt 30 then engages upward through the loop 14 and then engaged downward again through the lower opening 151 of the retainer 15. When the safety belt 30 is locked in place and when the passenger moves forward, the resilient member 10 may be bent (FIG. 9) so as to absorb the shocks transmitted to the safety belt 30 and so as to prevent the passenger from being hurt.

Figure 10:
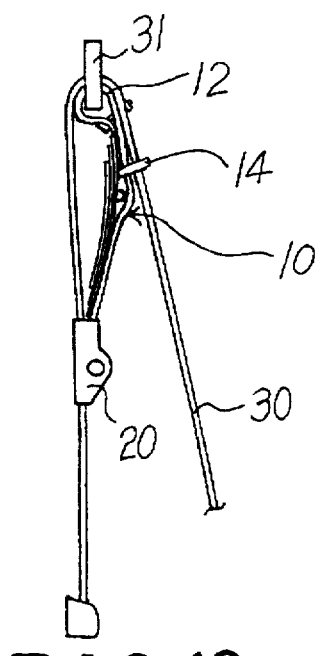
FIG. 10 is a schematic view illustrating the other application of the cushioning device.

Referring next to FIG. 10, the resilient member 10 also includes one end for securing to one end of the safety belt 30 and includes a clamping device 20 secured to the other end for engaging with and for securing to the middle portion of the safety belt 30 so as to absorb shocks transmitted to the safety belt.

Accordingly, the cushioning device in accordance with the present invention includes one end for securing to the vehicle and includes the other end for securing to the safety belt, such that the safety belt may be resiliently moved for a small distance and such that the cushioning device may be used for absorbing shocks transmitted to the safety bait.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A cushioning device for engaging with a safety belt of a vehicle and for cushioning the safety belt, said cushioning device comprising:

a resilient member including a first plate having a first end for securing to the vehicle, a middle portion, and a second end;

at least one second plate secured to said middle portion of said first plate for increasing a resilience of said resilient member;

means for securing said second end of said resilient member to the safety belt and for allowing the safety belt to be resiliently moved for a distance; and wherein said first plate and said at least one second plate are U-shaped and have a lower portion secured together.

2. A cushioning device according to claim 1, wherein said first plate includes a bulge formed thereon opposite to sad at least one second plate.

3. A cushioning device according to claim 2, wherein said resilient member includes a tubular member engaged in said bulge for increasing the resilience of said resilient member.

4. A cushioning device according to claim 1, wherein said securing means includes a bracket secured to said second end of said resilient member and having a chamber for receiving the safety belt, a flap pivotally coupled to said bracket and having a plurality of projections for engaging with the safety belt, and means for biasing said projections of said flap to engage with the safety belt.

5. A cushioning device according to claim 1, wherein said securing means includes a retainer secured to said second end of said resilient member, said retainer includes two openings for engaging with the safety belt and for defining a beam therebetween, said retainer allows said second end of said resilient member to be bent and moved toward said first end of said resilient member when the safety belt is moved by a passenger.

* * * * *